(12) United States Patent
Feinaeugle et al.

(10) Patent No.: US 10,089,271 B2
(45) Date of Patent: Oct. 2, 2018

(54) FIELD BUS SYSTEM

(71) Applicant: Balluff GmbH, Neuhausen a. d. F (DE)

(72) Inventors: Albert Feinaeugle, Wildberg (DE);
Stephan Langer, Neuhausen (DE);
Stephan Franz, Uhingen (DE)

(73) Assignee: Balluff GmbH, Neuhausen a. d. F. (DE)

( * ) Notice: Subject to any disclaimer, the term of this patent is extended or adjusted under 35 U.S.C. 154(b) by 275 days.

(21) Appl. No.: 14/404,066

(22) PCT Filed: May 23, 2013

(86) PCT No.: PCT/DE2013/000280
§ 371 (c)(1),
(2) Date: Nov. 26, 2014

(87) PCT Pub. No.: WO2013/178210
PCT Pub. Date: Dec. 5, 2013

(65) Prior Publication Data
US 2015/0143008 A1    May 21, 2015

(30) Foreign Application Priority Data

May 29, 2012 (DE) .......................... 10 2012 010 383
Jul. 25, 2012 (DE) .......................... 10 2012 014 682

(51) Int. Cl.
G06F 13/00 (2006.01)
G06F 13/38 (2006.01)
(Continued)

(52) U.S. Cl.
CPC ....... *G06F 13/385* (2013.01); *G05B 19/0423* (2013.01); *G06F 13/364* (2013.01);
(Continued)

(58) Field of Classification Search
None
See application file for complete search history.

(56) References Cited

U.S. PATENT DOCUMENTS 7,496,707 B2  2/2009 Freking et al.
7,668,990 B2  2/2010 Krzyzanowski et al.
(Continued)

FOREIGN PATENT DOCUMENTS

CN    1591250 A    3/2005
CN    1802612 A    7/2006
(Continued)

OTHER PUBLICATIONS

ISO 15745-1, Industrial automation systems and integration—Open systems application integration framework—Part 1: Generic reference description, First edition Mar. 1, 2003.
(Continued)

*Primary Examiner* — Henry Tsai
*Assistant Examiner* — Aurangzeb Hassan
(74) *Attorney, Agent, or Firm* — Collard & Roe, P.C.

(57) ABSTRACT

A field bus system includes at least one bus module designed as a master module with at least one connecting device for connection to a network and with at least one port for connecting a parameterizable IO link device. The field bus system uses a data storage device which is designed as an IO link device and which can be connected to the at least one port for connecting an IO link device and in which all parameters of the IO link devices connected to the master module are stored and can be read by the master module.

12 Claims, 1 Drawing Sheet

(51) Int. Cl.
*H04L 12/40* (2006.01)
*G05B 19/042* (2006.01)
*G06F 13/364* (2006.01)
*H04L 12/403* (2006.01)
*G06F 13/42* (2006.01)

(52) U.S. Cl.
CPC ............... *H04L 12/40032* (2013.01); *G05B 2219/25428* (2013.01); *G06F 13/4291* (2013.01); *H04L 12/403* (2013.01); *H04L 2012/4026* (2013.01)

(56) References Cited

U.S. PATENT DOCUMENTS

| | | | |
|---|---|---|---|
| 7,870,299 | B1 | 1/2011 | Sorensen et al. |
| 8,814,233 | B2 | 8/2014 | Leska et al. |
| 9,244,454 | B2 | 1/2016 | Neupärtl et al. |
| 2004/0107265 | A1 | 6/2004 | Yasunaga |
| 2004/0230323 | A1* | 11/2004 | Glanzer ............. G05B 9/02 700/18 |
| 2004/0260405 | A1 | 12/2004 | Eddie et al. |
| 2006/0142876 | A1 | 6/2006 | Kalhoff et al. |
| 2007/0011365 | A1 | 1/2007 | Jurisch et al. |
| 2009/0083446 | A1* | 3/2009 | Konieczny ........... G05B 19/052 710/2 |
| 2009/0125666 | A1 | 5/2009 | Freking et al. |
| 2009/0276180 | A1 | 11/2009 | Schneider et al. |
| 2010/0114334 | A1* | 5/2010 | Krumsiek ........... G05B 19/042 700/3 |
| 2010/0146182 | A1* | 6/2010 | Gutekunst ......... H04L 12/40032 710/305 |
| 2010/0191875 | A1 | 7/2010 | Beyer et al. |
| 2012/0110225 | A1* | 5/2012 | Wessling ................. G04G 5/00 710/61 |
| 2012/0210037 | A1 | 8/2012 | Kiesel et al. |
| 2012/0296446 | A1 | 11/2012 | Neupaertl et al. |
| 2013/0111087 | A1 | 5/2013 | Kaufleitner |
| 2013/0222123 | A1* | 8/2013 | Wessling ........... G05B 19/0423 340/12.22 |
| 2014/0214232 | A1 | 7/2014 | Koppmann et al. |
| 2014/0336792 | A1 | 11/2014 | Stamberg et al. |
| 2015/0121507 | A1 | 4/2015 | Haija et al. |

FOREIGN PATENT DOCUMENTS

| | | |
|---|---|---|
| CN | 101132361 A | 2/2008 |
| CN | 1011244530 A | 2/2008 |
| CN | 101562559 A | 10/2009 |
| CN | 101826966 A | 9/2010 |
| CN | 201837860 U | 5/2011 |
| DE | 102 59 391 A1 | 7/2004 |
| DE | 10 2004 015 227 A1 | 10/2005 |
| DE | 10 2008 038 417 A1 | 2/2010 |
| DE | 10 2008 062 851 B3 | 4/2010 |
| DE | 10 2008 060 004 B4 | 5/2010 |
| DE | 10 2008 060 006 B4 | 5/2010 |
| DE | 10 2009 013303 A1 | 9/2010 |
| DE | 20 2008 017 894 U1 | 10/2010 |
| DE | 10 2010 038 457 A1 | 2/2012 |
| DE | 10 2011 081 766 A1 | 2/2013 |
| EP | 1 884 844 A1 | 2/2008 |
| EP | 2 161 638 A1 | 3/2010 |
| EP | 2 187 278 A1 | 5/2010 |
| EP | 2 211 523 A1 | 7/2010 |
| GB | 2 403 042 A | 12/2004 |
| WO | 2011/047772 A1 | 4/2011 |

OTHER PUBLICATIONS

ISO 15745-1, Industrial automation systems and integration—Open systems application integration framework—Part 1: Generic reference description, First edition Mar. 1, 2003, Amendment 1 (Apr. 1, 2007).
ISO 15745-2, Industrial automation systems and integration—Open systems application integration framework—Part 2: Reference description for ISO 11898-based control systems, First edition Nov. 15, 2003.
ISO 15745-3, Industrial automation systems and integration—Open systems application integration framework—Part 3: Reference description for IEC 61158-based control systems, First edition Nov. 15, 2003.
ISO 15745-4, Industrial automation systems and integration—Open systems application integration framework—Part 4: Reference description for Ethernet-based control systems, First edition Nov. 15, 2003.
ISO 15745-4, Industrial automation systems and integration—Open systems application integration framework—Part 4: Reference description for Ethernet-based control systems, First edition Nov. 15, 2003, Amendment 1: PROFINET profiles.(Feb. 15, 2006).
ISO 15745-4, Industrial automation systems and integration—Open systems application integration framework—Part 4: Reference description for Ethernet-based control systems, First edition Nov. 15, 2003, Amendment 2: Profiles for Modbus TCP, EtherCAT and ETHERNET powerlink (Feb. 1, 2007).
ISO 15745-5, Industrial automation systems and integration—Open systems application integration framework—Part 5: Reference description for HDLC-based control systems, First edition Feb. 1, 2007.
English translation of Chinese Office Action, including Search Report, dated Apr. 19, 2016 in Chinese Application No. 201380032743.0.
International Search Report of PCT/DE2013/000255, dated Oct. 22, 2013.
International Search Report of PCT/DE2013/000270, dated Oct. 22, 2013.
IEC 61131-9, International Standard, "Programmable controllers—Part 9: Single-drop digital communication interface for small sensors and actuators (SDCI)," Edition 1.0, Sep. 2013, total of 576 pages.
Profibus Nutzerorganisation E.V. PNO, "PROFIsafe System Description Technology and Application", Internet Citation, Nov. 2010, pp. 1-26.
German Examination Report dated Jul. 19, 2016 in German Application No. 10 2012 014 682.5, with English translation of relevant parts.
International Search Report of PCT/DE2013/000280, dated Sep. 11, 2013.
Chinese Office Action in CN 201380031645.5, dated Mar. 18, 2016, with English translation.
Chinese Office Action in CN201380032745, dated Dec. 23, 2016.
Second Chinese Office Action in CN201380032743.0, dated Dec. 30, 2016.
German Office Action dated Jun. 28, 2016 in German Application No. 10 2012 014 681.7 with English translation of relevant parts.
"IO-Link System Description—Technology and Application" downloaded from www.io-link.com, Feb. 2016, total of 20 pages.
Second Chinese Office Action in CN201380032745.X, dated Aug. 21, 2017.
Third Chinese Office Action in CN201380032743.0, dated Jun. 26, 2017.

* cited by examiner

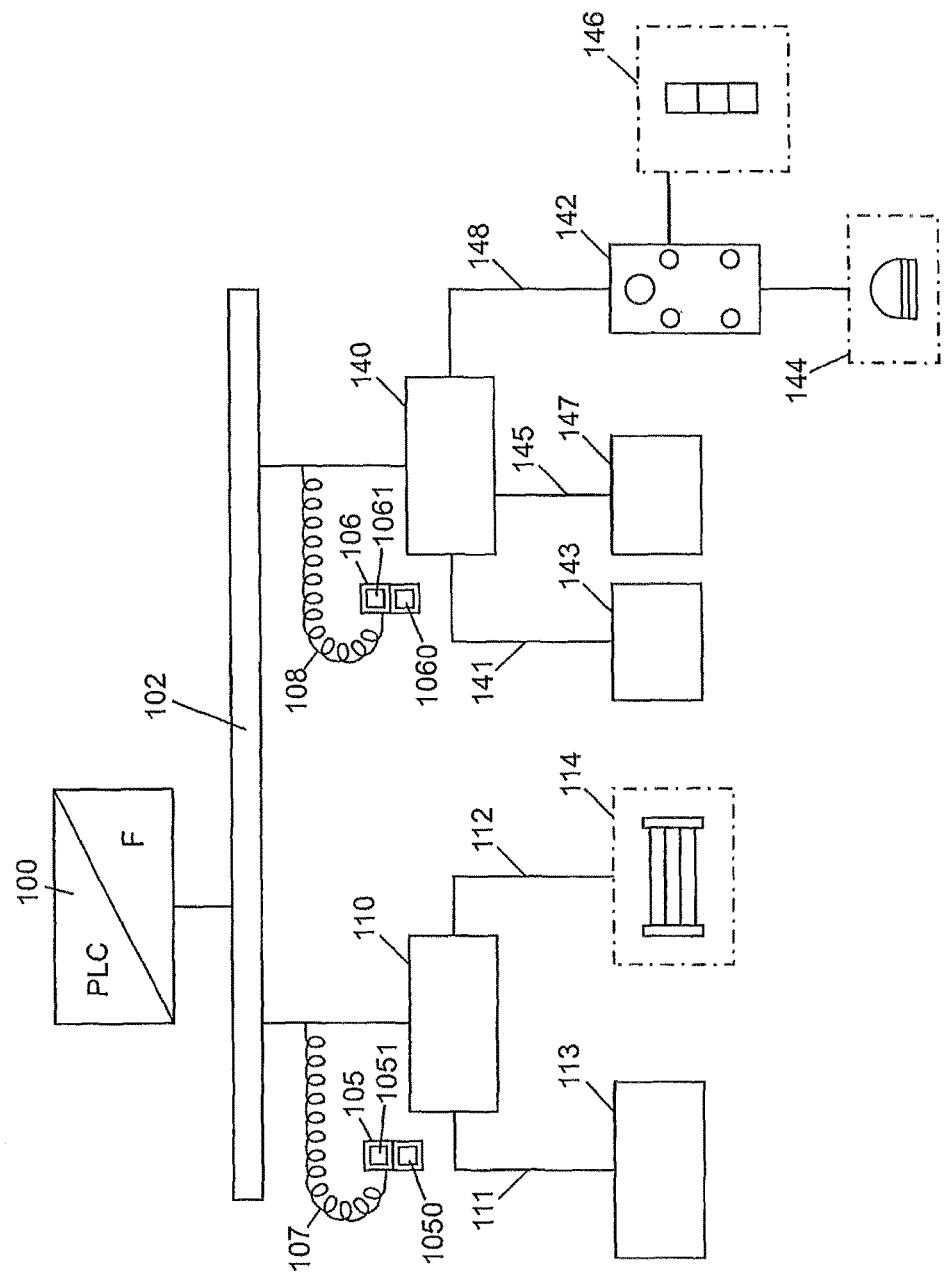

FIELD BUS SYSTEM

CROSS REFERENCE TO RELATED APPLICATIONS

This application is the National Stage of PCT/DE2013/000280 filed on May 23, 2013, which claims priority under 35 U.S.C. § 119 of German Application Nos. 10 2012 010 383.2 filed on May 29, 2012, and 10 2012 014 682.5 filed on Jul. 25, 2012, the disclosures of which are incorporated by reference. The international application under PCT article 21 (2) was not published in English.

The invention relates to a field bus system and a data storage device according to the preamble of the independent claims.

STATE OF THE ART

In the field of machinery and plant engineering as well as in automation engineering numerous standardized field bus systems have proven to provide good alternatives to parallel individual wiring. Here, a plurality of so-called field bus modules is connected to a central control device via a field bus. In turn, terminal devices are connected to the field bus modules. More recently, IO link connections have been used for connecting the terminal devices to the field bus modules. When this is done, the field bus modules take over the function of the IO link master. Terminal devices can be sensors, actuators, display devices, operator devices or smaller drives in machines, for example. In many assembly facilities the space requirements for the cabling/wiring and the switch box for the electrical installation often exceed the installation space of the mechanical handling system. Almost always the costs for the work hours as well as the material required for the installation of the hardware for signal transmission to the machine exceed the purchasing costs of the connected binary sensors and actuators. For this reason, with view to avoiding an expensive and complicated wiring and to reducing costs, sensors with analog signals or serial interfaces, parameterizable multi-channel sensors or devices having diagnostic functions are often dispensed with, even if it would actually be favourable to use them.

In order to tackle this problem, a consortium of involved manufacturers has specified a new standard for a more intelligent sensor/actuator interface which is called "IO link". It is planned to standardize the IO link as an international open standard in the norm IEC 61131-9. IO link devices are described through description files IODD, IO link device description. As a description language, IODD is to be standardized as an open standard in the norm ISO 15745. An IO link is a bidirectional serial point-to-point connection for signal transmission between sensors and actuators and the IO level of the machine. In principle, IO link transmits data between an IO link master and a connected IO link device as the slave. The interface also serves for energy supply. Field bus modules as well as SPS interface assemblies are available to be used as an IO link master. IO link is downward compatible to binary standard sensors and generally uses unshielded three- or five-wire standard cables. While the field bus level is responsible for interconnecting individual machines or their components with the control system of the plant, the IO link is assigned to the machine or sensor actuator level. The field bus level comprises most of the standardized field busses such as are generally used in machinery and plant engineering. Commonly used field busses are, for example, PROFIBUS-DP, Interbus, DeviceNet, CC-Link and CANopen. More recently, also Ethernet-based field bus standards such as PROFINET, EtherNet/IP, EtherCAT as well as Ethernet POWERLINK have been used. Field busses are used in a particularly advantageous manner for bridging greater distances between individual participants, which can lie between several 100 meters up to sometimes more than 10 km.

Apart from the purely functional signals, there are also always signals to be found in a machine which are related to safety and which serve for providing security for people as well as for the appliance. Commonly used safe signals come from safety devices and safety switches, such as door safety switches, door lock switch devices, light curtains, emergency stop switches etc. In the following, the term "security devices" always refers to such safety devices and safety switches.

In such field bus systems field bus modules or if IO-link devices are used IO-link devices or also master assemblies have to be replaced in some cases. It is a general problem with this procedure, that the data stored in the individual devices, for example addresses, parameters and the like, have to be replicated.

In DE 10 2008 060 006 B4, a field bus system of the generic kind is described, in which at least one field bus module has one address pin for at least one address plug and in which the field bus module is informed about its address within the network by means of connecting the at least one address plug. The plug can be attached to the cable and/or to an application by means of a fixing device, thus making sure that it cannot be lost. A plug can be used to address and thus identify the field bus module within the network. For this purpose, the address is stored in the plug. In this way, the system can be provided with the address of the field bus module in a simple manner, and particularly without incurring high manufacturing expenditure and so the field bus module can be addressed.

In field bus systems that are equipped with parameterizable IO link devices, the parameter set of the IO link devices has to be recovered when a parameterizable IO link device is replaced, for example due to a malfunction or a defect.

It is known from the use of IO link devices of the version 1.1 that when a parameterizable IO link device, such as a sensor or an actuator, is replaced, the automatic replication of the device parameters is facilitated in case of service by the master assembly transferring a previously created copy of the parameters of the IO link device into the replaced substitute device and saving it there. This happens automatically as the communication connection between the master assembly (the so-called IO link master) and the newly replaced IO link device is first started up. In this manner, the exchange of the defective device is reduced to the mechanical replacement of the defective device in a very advantageous manner. The correct parameter supply is performed by the master assembly.

What is now problematic, however, is the case in which the master assembly itself, to which several IO link devices are connected as well, for example, has to be replaced.

DISCLOSURE OF THE INVENTION

Advantages of the Invention

Now, the field bus system according to the invention has the advantage that, for example in the event of a malfunction, a master assembly, too, can be replaced in an easy manner, wherein in this event, as well, the replacement is quasi reduced to the mechanical exchange. This is achieved in that a data storage device that is embodied as an IO link device and that is connected to at least one port of the master assembly meant for linking an IO link device and that has a memory in which all parameters of the IO link devices that are connected to the master assembly are saved is read out by the master assembly. In this manner, all parameters of all IO link devices connected to the master assembly and also further data that are related to the master assembly are read out from the memory of the data storage device and restored to a corresponding memory of a newly replaced master assembly. Thus, the replacement of the master assembly can also be reduced to a mechanic replacement, without having to read in or determine the parameters of all the IO link devices connected to the master assembly all over again with extremely high manufacturing expenses.

Through the measures that are specified in the dependent claims, advantageous further developments and enhancements of the field bus system as it is indicated in the independent claim are possible. Thus, it is envisioned in an advantageous embodiment that the data storage device is embodied as an IO link device plug that does not have a cable outlet. In this case, only this IO link plug has to be plugged into an IO link plug-in position in the event of a replacement of the master assembly in order to carry out the parameterization of all the IO link devices connected to the master assembly and also of the master assembly itself. Especially in practical use, such an embodiment in the form of a plug has proven to be very advantageous.

Advantageously, the data storage device comprises a communication device for the purpose of bidirectional communication with the master assembly. Hereby it can be ensured that only the most recent data of the master assembly are provided in the data storage device, especially when it comes to parameters that can be changed over time.

Further, it is advantageously provided that, in the plugged-in state, the data storage device can be supplied with energy via the IO link device port. In this manner, a separate energy supply can be dispensed with.

Advantageously, the data storage device comprises at least one control element, such as a button, a keyboard or the like as well as an optical and/or acoustic display device. This display device serves for providing the optical/acoustic display of a successful transmission of the data (parameters) to the master assembly.

In order to ensure an easy and robust handling it is provided that the data storage device, i.e. particularly the IO link device plug, can be secured on a flexible fixing device at the master assembly or on a cable that is leading to or away from the same. In this way it is prevented that the data storage device is lost.

In principle, it is possible to use the most diverse field bus systems. Especially preferred is the use of an Ethernet-based network.

SHORT DESCRIPTION OF THE DRAWINGS

Embodiments of the invention are shown in the drawing and are described in more detail in the following description.

In the FIGURE, a schematic representation of a field bus system in which the invention is made use of is shown.

EMBODIMENTS OF THE INVENTION

The FIGURE shows a schematic representation of a field bus system for controlling terminal devices that are embodied as IO link devices. A central control device, a controller 100, is embodied as a PLC (programmable logic control), for one thing, and, for another thing, as a F control device (fail safe control device). This means that the controller 100 is able to control ordinary terminal devices as well as safety devices, or it can process their data. Master assemblies 110, 140 are connected to this central controller 100 via a field bus 102, wherein an IO link device 113, which is not relevant with regard to safety, i.e. which is not a safety device, is connected via an IO link connection 111. A safety device 114, for example a light curtain, a light grid, a receiver, a light barrier, a laser scanner etc., is connected via an IO link connection 112. The FIGURE shows a schematic representation of a light curtain. This light curtain can be arranged in a safety-relevant area of a machine, for example, and is supposed to ensure that the machine cannot be operated when a person is situated in the area of the light rays of the light curtain.

Other IO link devices 143, 147 that are not relevant with regard to safety, such as, for example, a RFID reading device, a measuring device or the like, are connected to the other master assembly 140 via IO links 141, 145. In addition, a safety device 142 is connected via an IO link connection 148, which may, for example, take the form of a distributor having safe inputs and outputs, to which an emergency stop switch 144 or a hydraulic valve 146 may be connected, for example. The actuation of the emergency stop switch 144 is a safety-relevant control parameter, as is controlling the hydraulic valve 146 or the interruption of the light rays of the light curtain 114. The IO link devices communicate with the corresponding master assemblies 110, 140 in a bidirectional manner and in a way that per se is known. Many of the IO devices are now parameterizable, i.e. parameters have to be applied prior to the start-up or during the operation. If an IO link device is replaced, e.g. due to a defect, a copy of the currently valid parameters of the respective IO link devices is saved in a memory (not shown) of the respective master assembly 110, 140 which are then restored into a respective memory of an IO link device in the event that the IO link device is replaced, so that the replaced IO link device is immediately provided with the currently valid correct parameter values. In this way, the replacement of an IO link device is reduced to the mere mechanical exchange of the IO link device. Elaborate parameterization procedures and applications of new data sets can be totally dispensed with.

What is now problematic, though, is the scenario when the entire master assembly 110, 140 malfunctions, for example because of a defect, and has to be replaced without any adequate support being available, e.g. through a parameter server in the controller 100. In this case, a copy of all parameters of the devices would have to be made and saved in the master 110. This is only possible with the aid of a so-called engineering system, which is generally undesirable. In order to make this kind of expenditure unnecessary, it is provided according to the invention that all data sets originating from the IO link devices, that is, all parameters and further data sets of all IO link devices, including safety-related as well as non-safety-related IO link devices 113, 114, 143, 147, 142, are saved in an external data storage device 105, 106. Thus, the storage device 105, 106 contains a mirrored data set of the respective master assembly 110, 140. In the event that the master assembly 110, 140 is replaced, now only the respective data set of the data storage device 105, 106 has to be read back into the respective master assembly 110, 140. After a successful resaving procedure, all parameters of all IO link devices are then available again in the replaced master assembly 110, 140. It has proven to be particularly advantageous if the data storage device 105, 106 is embodied as an IO link device plug that is respectively arranged via a flexible fixing device 107, 108 either at the corresponding master assembly 110, 140 or at a cable that is leading to or away from the master assembly 110, 140. In this way, the plug 105, 106 cannot be lost. Resaving of the data sets is then carried out by simply plugging in the IO link device plug 105 or 106 into an IO link device socket of an IO link device 113, 114 or 143, 147, 142 that is connected to the respective master assembly 110, 140. Due to the embodiment as an IO link plug which is connected to any IO link device socket, additional hardware measures can be completely dispensed with. The replacement of the master assembly 110, 140 can be carried out in a manner that is as quick as possible. By restoring the data sets from the storage device in the form of a plug 105, 106 all parameters can be restored immediately and directly after the exchange of the master assembly 110, 140. What is especially advantageous is that the plug respectively has at least one control element 1050 or 1060 for this purpose, e.g. a button or a keyboard or the like, as well as an acoustic and/or optical display device 1051 or 1061. This optical/acoustic display device can emit an optical and/or an acoustic signal in order to confirm the successful resaving of the data sets.

The invention claimed is:

1. Field bus system,
comprising at least one bus module that is embodied as a master assembly with at least one port device for connecting to a network and with at least one port for connecting at least one particularly parameterizable IO link device, the IO link device being according to the international open standard in the norm IEC 61131-9, and
comprising a data storage device that is embodied as an IO link device plug and that can be connected to the at least one port for connecting the at least one IO link device and in which all parameters of the at least one IO link device that is connected to the master assembly are stored and can be read out by the master assembly such that the data storage device facilitates replacement of the master assembly by connecting to a new master assembly after the replacement and by providing the parameters of the at least one IO link device to the new master assembly such that the new master assembly is configured to parameterize the at least one IO link device.

2. Field bus system according to claim 1, wherein the data storage device has a communication device for the purpose of bidirectional communication with the master assembly.

3. Field bus system according to claim 1, wherein the data storage device can be supplied with energy via the IC link device port in the plugged-in state.

4. Field bus system according to claim 1, wherein the data storage device comprises at least one control element and an optical and/or an acoustic display device.

5. Field bus system according to claim 4, wherein the optical and/or acoustic display device indicate the successful transmission of the parameters from and to the master assembly.

6. Field bus system according to claim 1, wherein the data storage device can be secured to the master assembly via a flexible fixing device.

7. Field bus system according to claim 1, wherein the data storage device is configured for being directly connected to the at least one IO link device, so that it can read out and restore parameter sets directly and without interposition of the master assembly.

8. Field bus system according to claim 1, wherein the network is Ethernet-based.

9. Data storage device for use in a field bus system according to claim 1, the data storage device being embodied as an IO link device plug and comprising a memory,
wherein the data storage device is configured to read out, store in the memory, and read back into the IO-link device all parameters of the at least one IO-link device directly or indirectly via the master assembly such that the data storage device facilitates replacement of the master assembly by connecting to a newly replaced master assembly and by providing the parameters of the at least one IO link device to the newly replaced master assembly such that the newly replaced master assembly is configured to parameterize the at least one IO link device.

10. Data storage device according to claim 9, wherein it comprises at least one control element and at least one optical and/or acoustic display device.

11. Data storage device according to claim 10, wherein the at least one optical and/or acoustic display device indicates the successful transmission of the parameters from and to a master assembly of the field bus system and/or from and to the at least one IO link device.

12. Data storage device according to claim 9, wherein it comprises a flexible fixing device.

* * * * *

UNITED STATES PATENT AND TRADEMARK OFFICE
CERTIFICATE OF CORRECTION

PATENT NO. : 10,089,271 B2
APPLICATION NO. : 14/404066
DATED : October 2, 2018
INVENTOR(S) : Feinaeugle et al.

Page 1 of 1

It is certified that error appears in the above-identified patent and that said Letters Patent is hereby corrected as shown below:

In the Claims

In Column 6, Line 5, (Line 2 of Claim 3) please change "IC link" to correctly read: --IO link--.

Signed and Sealed this
Sixth Day of November, 2018

Andrei Iancu
*Director of the United States Patent and Trademark Office*